US012586871B2

(12) United States Patent
Wallborg et al.

(10) Patent No.: US 12,586,871 B2
(45) Date of Patent: Mar. 24, 2026

(54) BUSBAR ASSEMBLY

(71) Applicant: Volvo Car Corporation, Gothenburg (SE)

(72) Inventors: Martin Hjälm Wallborg, Harestad (SE); Charbel Nassif, Lindome (SE); Daniel Karlsson, Daniel Island, SC (US); Klas Persson, Kungälv (SE)

(73) Assignee: Volvo Car Corporation, Gothenburg (SE)

( * ) Notice: Subject to any disclaimer, the term of this patent is extended or adjusted under 35 U.S.C. 154(b) by 562 days.

(21) Appl. No.: 18/154,139

(22) Filed: Jan. 13, 2023

(65) Prior Publication Data

US 2023/0231278 A1 Jul. 20, 2023

(30) Foreign Application Priority Data

Jan. 18, 2022 (EP) ..................................... 22152003

(51) Int. Cl.
*H01M 50/503* (2021.01)
*H01M 50/209* (2021.01)
*H01M 50/289* (2021.01)
*H01M 50/505* (2021.01)

(52) U.S. Cl.
CPC ....... *H01M 50/503* (2021.01); *H01M 50/209* (2021.01); *H01M 50/289* (2021.01); *H01M 50/505* (2021.01)

(58) Field of Classification Search
CPC ............. H01M 50/503; H01M 50/505; H01M 50/209; H01M 50/289

USPC ......................................................... 429/159
See application file for complete search history.

(56) References Cited

U.S. PATENT DOCUMENTS

2011/0076521 A1    3/2011   Shimizu et al.
2016/0372796 A1   12/2016   Nishihara
2018/0034014 A1    2/2018   Ichikawa et al.

OTHER PUBLICATIONS

Extended EP Search Report for EP Application No. 22152003.4 dated Jul. 11, 2022.

*Primary Examiner* — Kevin P Kerns
(74) *Attorney, Agent, or Firm* — Amin, Turocy & Watson, LLP

(57) ABSTRACT

A busbar assembly includes an elongated support structure with
a bottom,
two side walls, extending in a length direction (L) along longitudinal sides,
two spaced-apart central ridges extending in the length direction (L),
a signal line, connected to the support structure between the central ridges,
conductor members positioned between the side walls and an adjacent central ridge, adapted for interconnecting terminals of battery cells that are adjacent when seen in the length direction (L). The sidewalls and the ridges each extend at a cover side of the bottom and define top adhesive surface strips with respective widths Ws, Wc, the strips being situated in a connecting plane and adapted for adhesive connection to a top plate of a battery pack casing.

18 Claims, 3 Drawing Sheets

BUSBAR ASSEMBLY

TECHNICAL FIELD

The disclosure relates to a busbar assembly comprising an elongated support structure having a length direction and a defined width, the support structure comprising a bottom, two side walls extending in the length direction along longitudinal sides, two spaced-apart central ridges extending in the length direction, a signal line strip, connected to the support structure between the central ridges, and conductor members positioned between the side walls and an adjacent central ridge, adapted for interconnecting terminals of battery cells that are adjacent when seen in the length direction.

The disclosure also relates to a battery pack comprising such a busbar, an electric vehicle and to a method of manufacturing a battery pack.

BACKGROUND ART

Battery electric vehicles (BEV) use a battery pack to store and provide electricity to motors. Until recently, most battery packs have been built up from an enclosure that is filled with subassemblies of battery cells (cell modules), electronics, thermal management components and more. The function of the enclosure has been to form a mechanically strong structure that protects the components inside the pack during a vehicle crash for example. Further functions of the enclosure are to provide a sealed environment to prevent water from getting into the pack, and to provide a Faraday cage around the components for EMC reasons. The battery packs have then traditionally been fixed to the body-in-white (BiW) underfloor of the vehicle with several mechanical fasteners.

Since the components inside the battery pack traditionally have been treated as subassemblies with their own mechanical structures, protected by the pack enclosure, there is built-in inefficiency in such designs in terms of volume, weight, and cost. And since the battery pack is treated as a separate unit from the rest of the vehicle, there is built in inefficiency there as well.

This has led to a high focus in the automotive industry to remove some of these redundant structures by providing a higher degree of integrating the various components, both inside the battery pack by removing some of the "double" mechanical structures, but also in the interface between the battery and the vehicle. The obvious gains by such a strategy is to integrate more energy in the same volume, reduce vehicle weight, increase the space and ergonomics of the vehicle cabin. A structural battery pack, which utilizes the battery cells as load bearing parts of the structure in all directions, has the potential for making lighter and cheaper electric vehicles.

One approach to designing a structural battery pack is to construct the battery pack into a sandwich structure, where the battery cells form the core of the sandwich, and metallic components forms the skin. A fundamental problem with a battery as a sandwich structure is that the core needs to be mechanically connected to the inside of the skin in all directions while the terminals of the battery cells need to be electrically isolated from any surrounding parts, and while empty channels are required inside the pack to be able to evacuate gases from the battery in the case of a thermal event. The terminal side of the battery cells traditionally have a large subassembly sometimes referred to as a busbar carrier. The busbar carrier usually is a large and thin plastic part containing the cell-to-cell busbars and signal wires for voltage- and temperature measurement.

It is known to form the busbar as a unit with the busbar conductors and signal wires integrated in a carrier that is connected to the battery cells.

It is an object to provide a busbar assembly that allows efficient manufacturing of a battery pack, while providing improved integrity. It is another object to provide a compact busbar assembly that allows efficient removal of gases from the battery pack in case of a thermal event.

SUMMARY

A battery assembly is provided, the sidewalls and the ridges each extending at a cover side from a bottom to a connecting plane and defining a top adhesive surface strip with respective widths Ws, Wc, the strips being situated in said connecting plane and adapted for adhesive connection to a top plate of a battery pack casing.

The raised sidewalls and central ridges define adhesive connect surfaces that establish a strong adhesive bond of the top plate of the battery casing with the underlying battery cells, via the busbar assembly. This improves the strength of the battery pack and prevents the top plate of the casing from buckling away from the battery cells in case of an impact.

The sidewalls and the central ridges define longitudinal channels that allow gases to evacuate in the length direction, in case of a thermal event and prevent gases from spreading sideways. This reduces chances of the gases igniting and prevents thermal damage.

The sidewalls and the central ridges may extend substantially along the length of the bottom of the support structure and having a height from the bottom that is higher than a height of the conductor members, for forming respective gas channels extending in the length direction between a top surface of the conductor members and the connecting plane and between a top surface of the signal line and the connecting plane.

The longitudinal areas above the cell form gas channels that prevent sideways expansion of the gases in case of a thermal event and hence mitigate the risk of such gases igniting.

The bottom of the busbar assembly may comprise a bottom contact plane adapted for adhesive connection to battery cell top surfaces, a central part of the bottom that is situated between the ridges comprising apertures and being positioned at a distance above the bottom contact plane, forming an accommodation space at a battery facing surface of the bottom, in which the signal line is received.

The flexible strip that carries the signal wires for supplying voltage and temperature signals from the battery cells to a controller, is mounted at the bottom of the support structure so that it is well protected during assembly. The walls of the central ridges form closed surfaces on each side of the flexible strip, so that sideways flow of gases during venting through the channels in the longitudinal direction is prevented.

The central part of the bottom of the busbar assembly can, at the battery facing side, have two stepped side edges, two rims extending in the length direction, on the battery facing side of the central part of the bottom, forming and adhesive accommodation channel between each stepped side edge and the respective rim.

Prior to mounting the bus bar assembly onto the top surface of the array of battery cells, adhesive is inserted in the accommodation channel, so that remains in a well-defined position until the moment the busbar assembly is place on the top surface of the battery cell and the adhesive is cured.

The bottom contact plane can comprise adhesive surface strips that extend parallel to the top adhesive surface strips.

Adhesive strips at the top cover side and bottom side of the busbar assembly that are vertically aligned provide a strong and reliable integration of the battery cells and the top cover of the casing.

A battery pack according to the disclosure, comprises a casing with a bottom wall, two side walls and a top wall, a number of rows of interconnected prismatic battery cells, each cell having in a top plane two spaced-apart electric terminals, the battery cells in each row being attached to a respective busbar assembly, side surfaces of the battery cells in an outer row of battery cells being adhesively connected to a casing side wall, the top walls of the battery cells being adhesively connected to the support structure and the top wall of the casing being adhesively connected to the support structure and being connected to the sidewalls.

The outer rows of battery cells are adhesively connected to the sidewalls and to the top wall of the battery pack casing, which sidewalls and top walls may be formed of aluminium, which results in a rigid and strong construction.

A method of manufacturing a battery pack comprises providing at least one row of prismatic battery cells, providing a busbar assembly, applying adhesive onto the bottom, connecting the busbar assembly to a top surface of the rows of battery cells, via the adhesive, providing adhesive on the top adhesive surface strips, and placing a casing cover on the top adhesive surface strips and connecting the casing cover via the adhesive.

The pre-assembled bus bar can be accurately and effective placed on the top surface of the rows of battery cells, where after the adhesive on the top cover side may be applied and the top cover of the casing is adhesively connected to the bus bar assembly and is connected to the sidewalls through welding or brazing.

The method of manufacturing may comprise providing a number of adjacent rows of prismatic battery cells, adhesively attaching a bottom plate of a casing to a bottom surface of the adjacent rows of battery cells, and adhesively attaching longitudinal side surfaces of outer rows of battery cells to longitudinal side walls of the casing.

The adhesive connection of the battery cells to the bottom plate, the side walls and the top cover of the casing, results in a strong battery pack.

After adhesive attachment of the busbar assembly and the top cover, the top cover may be connected to the sidewalls of the casing via welding or brazing.

BRIEF DESCRIPTION OF THE DRAWINGS

A busbar assembly according to the disclosure will, by way of non-limiting example, be described in detail with reference to the accompanying drawings. In the drawings.

DETAILED DESCRIPTION

Figure 1:
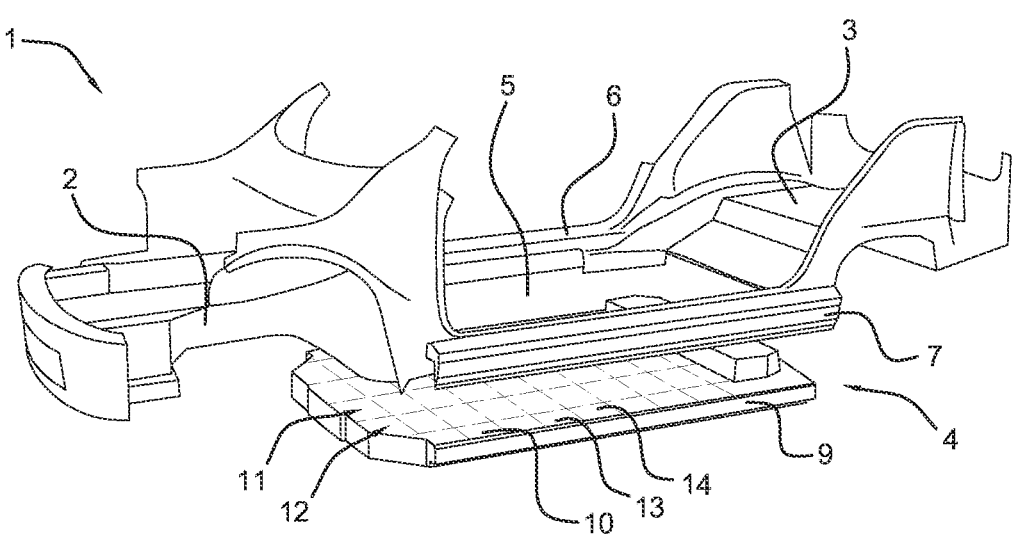
FIG. 1 shows a structural battery pack connected to a front and rear frame part of an electric vehicle.

FIG. 1 shows a frame 1 of an electric vehicle, comprising a front frame structure 2, a rear frame structure 3, including a rear floor, and a structural battery assembly 4 forming a bottom structure 5 of the vehicle. The structural battery assembly 4 comprises longitudinal sill profiles 6,7 that interconnect the front and rear frame structures 2,3 and that support a structural battery pack 9. The battery pack 9 houses cell stacks 11,12 of interconnected prismatic battery cells 13,14, the stacks extending in the length direction L. The terminals of the battery cells 13,14 in each stack 11,12 are interconnected by bus bar assemblies carrying voltage terminals and signal lines that connect to sensors measuring voltage and temperature in each cell 13, 14. The top cover plate 10 of the battery pack forms the bottom of the cabin of the vehicle.

Figure 2:
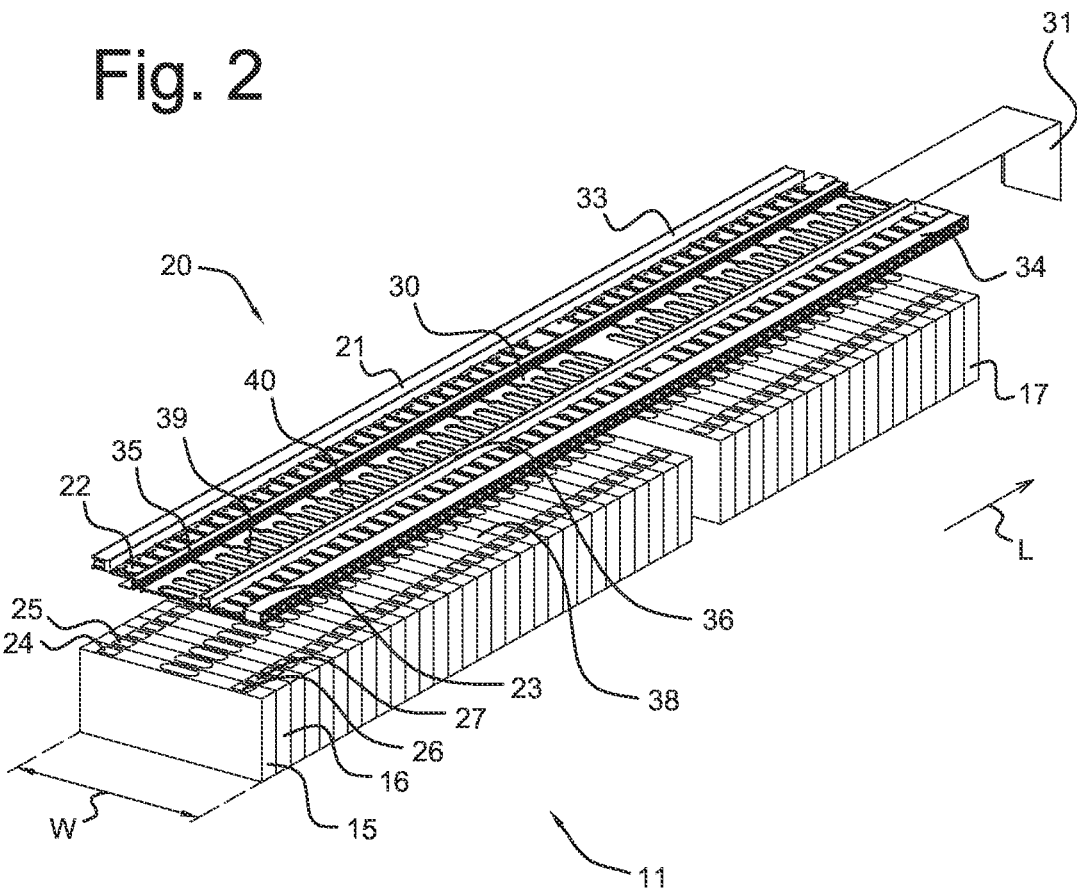
FIG. 2 shows a perspective view of a stack of battery cells and a busbar assembly, prior to adhesive connection of the busbar assembly.

FIG. 2 shows a cell stack 11 of prismatic battery cells 15,16,17 and a bus bar assembly 20 connected to a top surface 38 of the battery cells. The battery cells 15, 16, 17 are of a width W of between 25 cm and 35 cm and comprise terminals 24, 26; 25, 27. Terminals 24,25; 26;27 of adjacent battery cells 15,16 are interconnected via metal conductor members 22,23 of the busbar assembly 20.

The busbar assembly 20 comprises an elongated support structure 30 of a plastic material, carrying the metal conductor members 22,23 and a signal line 31 formed by a flexible PCB that comprises a number of conductive paths interconnecting temperature and voltage sensors on each battery cell 15, 16, 17. The support structure 30 comprises upstanding side walls 33,34 and central ridges 35, 36. The signal line 31 is supported on the bottom side of the support structure 30, in a central area between the ridges 35,36. Adhesive can be applied to surface 21 of side wall 33.

Ventilation apertures 39, 40 are provided in the bottom of the central area of the support structure 30, for removal of gases from the battery cells that may be released in case of a thermal event. The bottom of the support structure 30 is adhesively connected to the top surface 38 of the battery cell stack 11.

Figure 3:
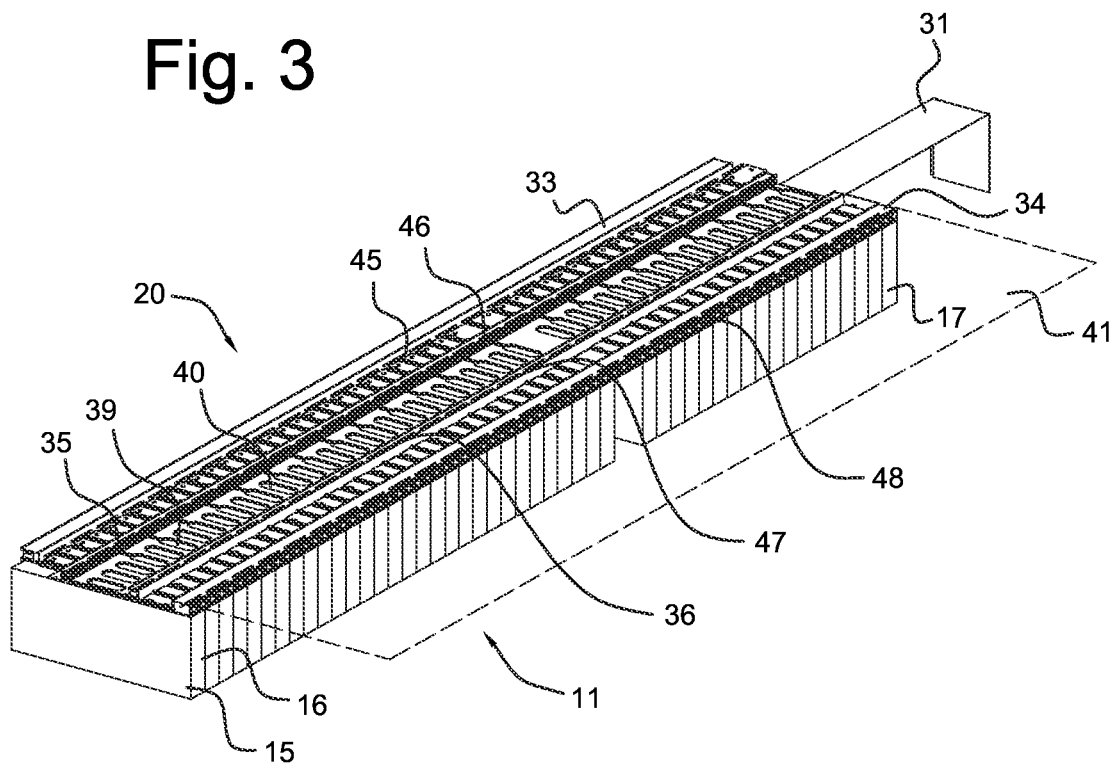
FIG. 3 shows the stack of battery cells of FIG. 2, with the busbar assembly attached to a top surface of the stack.

As shown in FIG. 3, the sidewalls 33,34 and central ridges 35,36 form adhesive surfaces 45, 46, 47, 48, defining a connecting plane 41 for connecting to a top cover of the battery pack 9, that are schematically indicated by the dashed lines in the figure.

Figure 4:
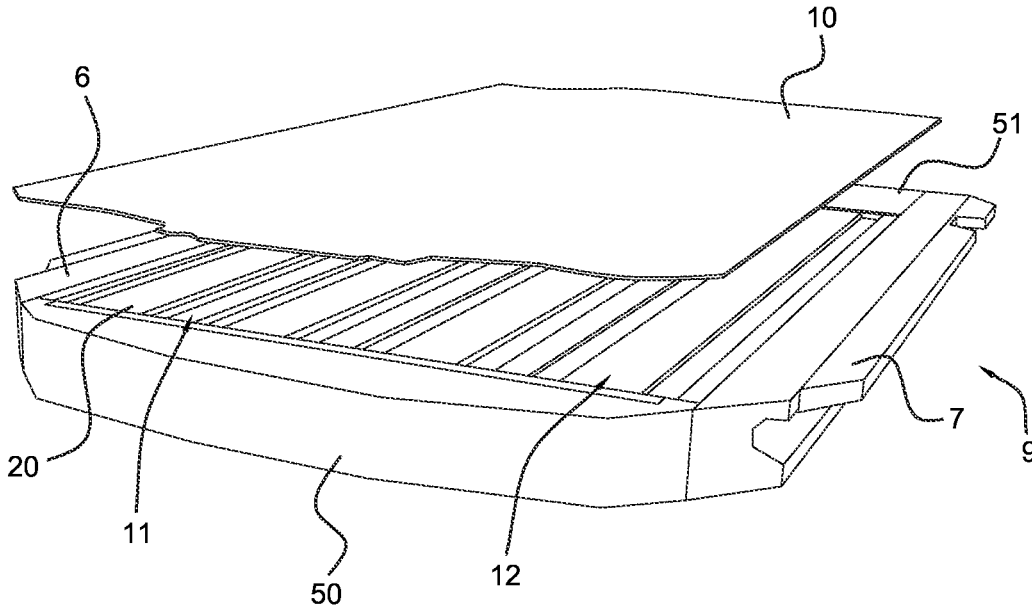
FIG. 4 shows a perspective view of a battery pack, at the moment of connecting of the top cover.

FIG. 4 shows the battery pack 9 with four battery cell stacks 11,12 that are mounted in a compressed state between front and rear transverse beams 50, 51 that are interconnected by the sill profiles 6,7. The top cover plate 10 is adhesively connected to the busbar assembly 20 of each stack 11, 12 of battery cells along the adhesive surfaces 45, 46, 47, 48. After adhesive connection of the top cover plate 10 to the busbar assemblies 20, the cover plate is connected to the sill profiles 6,7 and to the front and rear transverse beams 50,51 by welding or brazing, to form a protective enclosure that prevents the ingress of moisture or particulate matter.

5

6

Figures 5, 6:
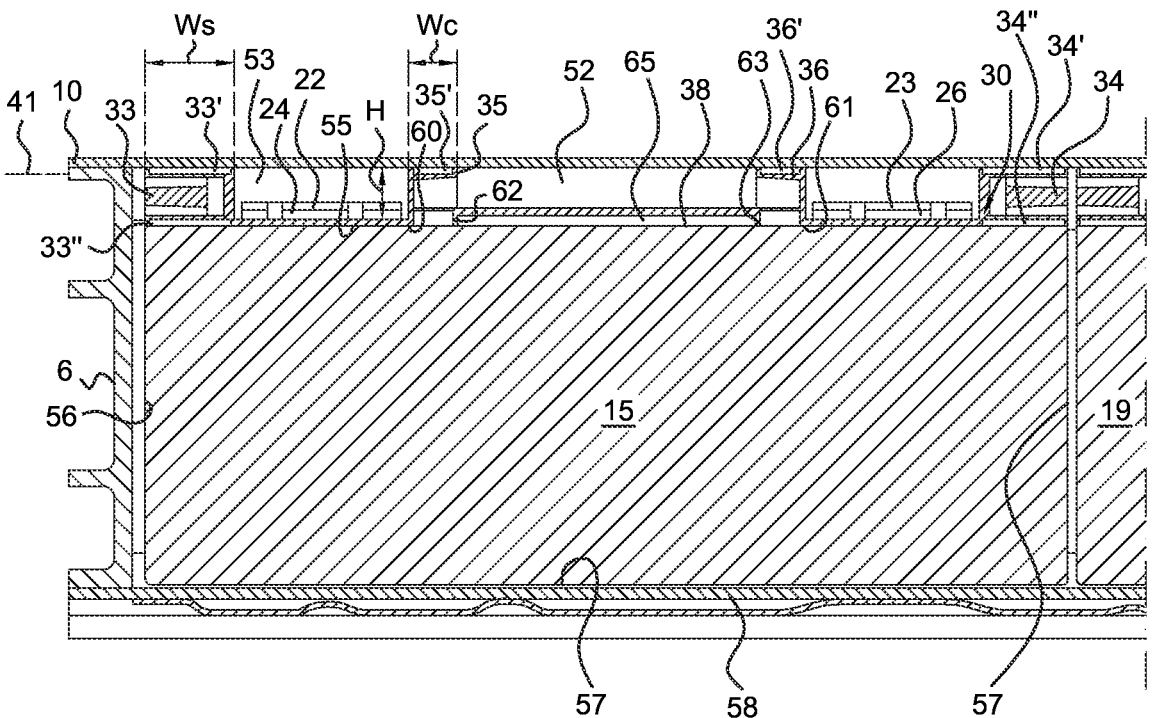
FIG. 5 shows a perspective view on an enlarged scale of the busbar assembly.
FIG. 6 shows a cross-sectional view of a part of the battery pack of FIG. 4.

FIG. 5 shows an enlarged perspective view of the busbar assembly 20 and the area between the central ridges 35,36. The area between the central ridges 35, 36 forms a ventilation channel 52 extending in the length direction L for the removal of gases, that enter into the channel via the apertures 39, 40 and flow in the direction of the arrows v1, v2. The gases are contained in the channel 52 by the central ridges 35,36 that prevent spreading of the gases in a transverse direction. The central ventilation channel 52 connects to ventilation apertures in the front and rear transverse beams 50,51.

FIG. 6 shows battery cell 15 with terminals 24, 26 connected to conductor members 22, 23 of the busbar assembly 20. The side walls 33, 34 and the central ridges 35, 36 define the connecting plane 41 in which the top cover 10 is attached along strips 33', 34', 35', 36' via an adhesive connection. The gas vent channel 52 extends in the length direction L, that is perpendicular to the plane of the drawing, and is defined between the central ridges 35, 36 and the top cover 10 of the casing. The height H of the sidewalls 33, 34 above the bottom 55 of the support structure 30 may be 1.5 cm-5 cm, leaving space above the conductor members 22,23 forming a channel 53, isolating conductive gases that are generated in case of a thermal event.

The bottom 55 of the support structure 30 is adhesively connected to the top surface 38 of the battery cell 15 along adhesive strips 33" and 34" that are situated vertically below the adhesive strips 33', 34'. The side surface 56 of the battery cell 15 is adhesively connected to the wall of the sill profile 6 of the casing, and the side surface 57 of battery cell 15 is glued to the adjacent battery cell 19. The bottom surface 57 of the cell 15 is glued to bottom plate 58 of the battery pack casing.

The bottom 55 of the support structure 30 comprises at the central ridges 35, 36 a stepped part 60, 61 and a parallel rim 62, 63, at a transverse distance from the stepped parts 60, 61, thus defining a groove for containing the adhesive during connection of the busbar assembly to the battery cells. The signal line (not shown in the drawing) is accommodated in the space 65 between the rims 62, 63, below the gas vent channel 52.

The width Ws of the sidewalls 33, 34 may be between 1 cm and 5 cm and the width Wc of the central ridges 35, 36 may be between 0.5 cm and 3 cm for a strong connection of the battery cell 15 to the top cover 10.

The invention claimed is:

1. A battery pack comprising:
   a casing with a first bottom wall, two first side walls, and a top wall; and
   a defined quantity of rows of battery cells, wherein each battery cell has two spaced-apart electric terminals in a top plane, wherein each row of battery cells is attached to a respective busbar assembly comprising:
      an elongated support structure having a length direction and a defined width, wherein the elongated support structure comprises:
      a second bottom wall,
      two second side walls, extending in the length direction along longitudinal sides,
      two spaced-apart central ridges extending in the length direction,
      a signal line, connected to the elongated support structure between the central ridges,
      conductor members positioned between the second side walls and an adjacent central ridge, adapted for interconnecting terminals of battery cells that are adjacent in the length direction, wherein the second side walls and the central ridges each extend at a cover side from the second bottom wall to a connecting plane and define a top adhesive surface strip, the top adhesive surface strips being situated in the connecting plane and adapted for adhesive connection to the top wall of the casing,
   wherein the second bottom wall comprises bottom adhesive surface strips that are respectively vertically aligned with the top adhesive surface strips,
   wherein the bottom adhesive surface strips are adhesively bonded to the respective tops of the battery cells, and
   wherein the top adhesive surface strips are adhesively bonded to the top wall.

2. The battery pack of claim 1, wherein the second side walls and the central ridges extend substantially along a length of the second bottom wall of the elongated support structure and have a height from the second bottom wall that is higher than a height of the conductor members, for forming respective gas channels extending in the length direction between a top surface of the conductor members and the connecting plane and between a top surface of the signal line and the connecting plane.

3. The battery pack of claim 1, wherein the second bottom wall comprises a bottom contact plane adapted for adhesive connection to the respective tops of the battery cells, wherein a central part of the second bottom wall that is situated between the central ridges comprises apertures and is positioned at a distance above the bottom contact plane, forming an accommodation space at a battery facing surface of the second bottom wall, in which the signal line is arranged to be received.

4. The battery pack of claim 3, wherein the central part of the second bottom wall has at the battery facing surface two stepped side edges, two rims extending in the length direction, on the battery facing surface of the central part of the second bottom wall, forming an adhesive accommodation channel between each of the stepped side edges and the respective rims.

5. The battery pack of claim 3, wherein the bottom adhesive surface strips extend parallel to the top adhesive surface strips.

6. A method of manufacturing a battery pack, the method comprising:
   providing a casing;
   providing at least one row of battery cells; and
   attaching a respective busbar assembly to each row of the least one row of battery cells and to the casing, wherein the respective busbar assembly comprises:
      an elongated support structure having a length direction and a defined width, the elongated support structure comprising:
      a bottom wall,
      two side walls, extending in the length direction along longitudinal sides,
      two spaced-apart central ridges extending in the length direction,
      a signal line, connected to the elongated support structure between the central ridges,
      conductor members positioned between the side walls and an adjacent central ridge, adapted for interconnecting terminals of battery cells that are adjacent in the length direction,
   wherein the side walls and the central ridges each extend at a cover side from the bottom wall to a connecting plane and define a top adhesive surface strip, the top adhesive surface strips being situated in the connecting plane and adapted for adhesive connection to a top wall of the casing, wherein the bottom wall comprises bottom adhesive surface strips that are respectively vertically aligned with the top adhesive surface strips, wherein the bottom adhesive surface strips are adhesively bonded to the respective tops of the battery cells, and wherein the top adhesive surface strips are adhesively bonded to the top wall of the casing.

7. The method of claim 6, wherein the providing the at least one row of battery cells comprises:
providing a plurality of adjacent rows of battery cells.

8. The method of claim 6, further comprising attaching the cover top wall of the casing being attached to side walls of the casing the sidewalls via welding or brazing.

9. An electric vehicle comprising:
a battery pack comprising:
a casing with a first bottom wall, two first side walls, and a top wall; and
a defined quantity of rows of battery cells, wherein each battery cell has two spaced-apart electric terminals in a top plane, wherein each row of battery cells is attached to a respective busbar assembly comprising:
an elongated support structure having a length direction and a defined width, wherein the elongated support structure comprises:
a second bottom wall,
two second side walls, extending in the length direction along longitudinal sides,
two spaced-apart central ridges extending in the length direction,
a signal line, connected to the elongated support structure between the central ridges,
conductor members positioned between the second side walls and an adjacent central ridge, adapted for interconnecting terminals of battery cells that are adjacent in the length direction,
wherein the second side walls and the central ridges each extend at a cover side from the second bottom wall to a connecting plane and define a top adhesive surface strip, the top adhesive surface strips being situated in the connecting plane and adapted for adhesive connection to the top wall of the casing,
wherein the second bottom wall comprises bottom adhesive surface strips that are respectively vertically aligned with the top adhesive surface strips,
wherein the bottom adhesive surface strips are adhesively bonded to the respective tops of the battery cells, and
wherein the top adhesive surface strips are adhesively bonded to the top wall.

10. The electric vehicle of claim 9, wherein the second side walls and the central ridges extend substantially along a length of the second bottom wall of the elongated support structure and have a height from the second bottom wall that is higher than a height of the conductor members, for forming respective gas channels extending in the length direction between a top surface of the conductor members and the connecting plane and between a top surface of the signal line and the connecting plane.

11. The electric vehicle of claim 9, wherein the second bottom wall comprises a bottom contact plane adapted for adhesive connection to the respective tops of the battery cells, wherein a central part of the second bottom wall that is situated between the central ridges comprises apertures and is positioned at a distance above the bottom contact plane, forming an accommodation space at a battery facing surface of the second bottom wall, in which the signal line is arranged to be received.

12. The electric vehicle of claim 11, wherein the central part of the second bottom wall has at the battery facing surface two stepped side edges, two rims extending in the length direction, on the battery facing surface of the central part of the second bottom wall, forming an adhesive accommodation channel between each of the stepped side edges and the respective rims.

13. The electric vehicle of claim 11, wherein the bottom adhesive surface strips extend parallel to the top adhesive surface strips.

14. A battery system comprising:
a plurality of battery packs, wherein each battery pack comprises:
a casing with a first bottom wall, two first side walls, and a top wall; and
a defined quantity of rows of battery cells, wherein each battery cell has two spaced-apart electric terminals in a top plane, wherein each row of battery cells is attached to a respective busbar assembly comprising:
an elongated support structure having a length direction and a defined width, wherein the elongated support structure comprises:
a second bottom wall,
two second side walls, extending in the length direction along longitudinal sides,
two spaced-apart central ridges extending in the length direction,
a signal line, connected to the elongated support structure between the central ridges,
conductor members positioned between the second side walls and an adjacent central ridge, adapted for interconnecting terminals of battery cells that are adjacent in the length direction,
wherein the second side walls and the central ridges each extend at a cover side from the second bottom wall to a connecting plane and define a top adhesive surface strip, the top adhesive surface strips being situated in the connecting plane and adapted for adhesive connection to the top wall of the casing,
wherein the second bottom wall comprises bottom adhesive surface strips that are respectively vertically aligned with the top adhesive surface strips,
wherein the bottom adhesive surface strips are adhesively bonded to the respective tops of the battery cells, and
wherein the top adhesive surface strips are adhesively bonded to the top wall.

15. The battery system of claim 14, wherein the second side walls and the central ridges extend substantially along a length of the second bottom wall of the elongated support structure and have a height from the second bottom wall that is higher than a height of the conductor members, for forming respective gas channels extending in the length direction between a top surface of the conductor members and the connecting plane and between a top surface of the signal line and the connecting plane.

16. The battery system of claim 14, wherein the second bottom wall comprises a bottom contact plane adapted for adhesive connection to the respective tops of the battery cells, wherein a central part of the second bottom wall that is situated between the central ridges comprises apertures and is positioned at a distance above the bottom contact plane, forming an accommodation space at a battery facing surface of the second bottom wall, in which the signal line is arranged to be received.

17. The battery system of claim 16, wherein the central part of the second bottom wall has at the battery facing surface two stepped side edges, two rims extending in the length direction, on the battery facing surface of the central part of the second bottom wall, forming an adhesive accommodation channel between each of the stepped side edges and the respective rims.

18. The battery system of claim 16, wherein the bottom adhesive surface strips extend parallel to the top adhesive surface strips.

\* \* \* \* \*